United States Patent
McHugh et al.

(10) Patent No.: US 6,700,972 B1
(45) Date of Patent: Mar. 2, 2004

(54) SYSTEM AND METHOD FOR PROCESSING AND COLLECTING DATA FROM A CALL DIRECTED TO A CALL CENTER

(75) Inventors: Patrick J. McHugh, Belmont, MA (US); Patrick Peterson, Cambridge, MA (US); Peter Myton Dick, Melrose, MA (US)

(73) Assignees: Verizon Corporate Services Group Inc., New York, NY (US); Genuity Inc., Woburn, MA (US)

( * ) Notice: Subject to any disclaimer, the term of this patent is extended or adjusted under 35 U.S.C. 154(b) by 0 days.

(21) Appl. No.: 09/383,056

(22) Filed: Aug. 25, 1999

(51) Int. Cl.$^7$ .............................. H04M 3/00; H04M 3/42

(52) U.S. Cl. ......................... 379/265.13; 379/265.01; 379/265.02; 379/207.15

(58) Field of Search ................................ 379/265, 266, 379/309, 112, 211

(56) References Cited

U.S. PATENT DOCUMENTS

| | | | |
|---|---|---|---|
| 4,071,698 A | 1/1978 | Barger, Jr. et al. | 179/2 |
| 4,792,968 A | 12/1988 | Katz | 379/92 |
| 4,845,739 A | 7/1989 | Katz | 379/92 |
| 4,930,150 A | 5/1990 | Katz | 379/93 |
| 4,932,046 A | 6/1990 | Katz et al. | 379/32 |
| 4,939,773 A | 7/1990 | Katz | 379/204 |
| 4,975,945 A | 12/1990 | Carbullido | 379/212 |
| 4,987,590 A | 1/1991 | Katz | 379/204 |
| 5,008,930 A * | 4/1991 | Gawrys et al. | 379/142.01 |
| 5,014,298 A | 5/1991 | Katz | 379/93 |
| 5,016,270 A | 5/1991 | Katz | 379/92 |
| 5,048,075 A | 9/1991 | Katz | 379/92 |
| 5,073,929 A | 12/1991 | Katz | 379/93 |
| 5,091,933 A | 2/1992 | Katz | 379/204 |
| 5,109,404 A | 4/1992 | Katz et al. | 379/88 |
| 5,128,984 A | 7/1992 | Katz | 379/92 |
| 5,185,787 A | 2/1993 | Katz | 379/204 |
| 5,218,631 A | 6/1993 | Katz | 379/88 |
| 5,224,153 A | 6/1993 | Katz | 379/93 |
| 5,251,252 A | 10/1993 | Katz | 379/92 |
| 5,255,309 A | 10/1993 | Katz | 379/88 |
| 5,259,023 A | 11/1993 | Katz | 379/88 |
| 5,297,197 A | 3/1994 | Katz | 379/204 |
| 5,349,633 A | 9/1994 | Katz | 379/88 |
| 5,351,285 A | 9/1994 | Katz | 379/94 |
| 5,359,645 A | 10/1994 | Katz | 379/93 |
| 5,365,575 A | 11/1994 | Katz | 379/92 |
| 5,414,754 A * | 5/1995 | Pugh et al. | 379/88.23 |

(List continued on next page.)

Primary Examiner—Ahmad F. Matar
Assistant Examiner—Hector Agdeppa
(74) Attorney, Agent, or Firm—Leonard C. Suchtya, Esq.

(57) ABSTRACT

The present invention provides a method and system for processing and collecting, at a telephone network central office, information for a call directed to a call center prior to the call being received at the call center. A call is received for processing at a telephone network central office that is local to the call origination location. At the central office, a determination is made as to whether the destination number of the call is identified in a selected database. In response to the call destination number being identified in the selected database, the central office solicits the caller to provide requested information. An indication of the requested information received from the caller is included in a data packet associated with the telephone call before the call is transferred from the central office. The call, including the indication of the requested information, is routed to the call center. At the central office, it may be determined whether the call originated from a business telephone number or a residential telephone number to facilitate processing of the call. In response to the call originating from a business telephone number, a request may be included in the requested information for the caller to enter a telephone number for which the caller desires account service from the call center. The requested information may include a type of account service the caller desires from the call center.

28 Claims, 9 Drawing Sheets

U.S. PATENT DOCUMENTS

| | | | | |
|---|---|---|---|---|
| 5,430,782 A | * | 7/1995 | Brady et al. | 379/221.14 |
| 5,442,688 A | | 8/1995 | Katz | 379/156 |
| 5,483,582 A | * | 1/1996 | Pugh et al. | 379/144 |
| 5,506,894 A | * | 4/1996 | Billings et al. | 379/127 |
| 5,537,470 A | * | 7/1996 | Lee | 379/266 |
| 5,553,120 A | | 9/1996 | Katz | 379/88 |
| 5,559,878 A | * | 9/1996 | Keys et al. | 379/210.01 |
| 5,561,707 A | | 10/1996 | Katz | 379/88 |
| 5,684,863 A | | 11/1997 | Katz | 379/88 |
| 5,787,156 A | | 7/1998 | Katz | 379/93.13 |
| 5,793,846 A | | 8/1998 | Katz | 379/88 |
| 5,815,551 A | | 9/1998 | Katz | 379/88 |
| 5,828,734 A | | 10/1998 | Katz | 379/93.13 |
| 5,835,576 A | | 11/1998 | Katz | 379/93.13 |
| 5,848,131 A | * | 12/1998 | Shaffer et al. | 379/88 |
| 5,878,130 A | * | 3/1999 | Andrews et al. | 379/265 |
| 5,898,762 A | | 4/1999 | Katz | 379/93.12 |
| 5,917,893 A | | 6/1999 | Katz | 379/93.02 |
| 5,974,120 A | | 10/1999 | Katz | 379/93.13 |
| 6,011,844 A | * | 1/2000 | Uppaluru et al. | 379/219 |
| 6,016,344 A | | 1/2000 | Katz | 379/260 |
| 6,035,021 A | | 3/2000 | Katz | 379/93.12 |
| 6,044,135 A | | 3/2000 | Katz | 379/93.13 |
| 6,134,315 A | * | 10/2000 | Galvin | 379/201.01 |
| 6,148,065 A | | 11/2000 | Katz | 379/88.2 |
| 6,151,387 A | | 11/2000 | Katz | 379/93.13 |
| 6,157,711 A | | 12/2000 | Katz | 379/265 |
| 6,292,547 B1 | | 9/2001 | Katz | 379/93.12 |
| 6,335,965 B1 | | 1/2002 | Katz | 379/93.12 |
| 6,349,134 B1 | | 2/2002 | Katz | 379/92.01 |
| 6,424,703 B1 | | 7/2002 | Katz | 379/93.13 |
| 6,434,223 B2 | | 8/2002 | Katz | 379/93.13 |
| 6,449,346 B1 | | 9/2002 | Katz | 379/93.12 |
| 2001/0014147 A1 | | 8/2001 | Katz | 379/93.13 |
| 2001/0021245 A1 | | 9/2001 | Katz | 379/92.01 |
| 2001/0026610 A1 | | 10/2001 | Katz | 379/93.13 |
| 2002/0025027 A1 | | 2/2002 | Katz | 379/91.02 |
| 2002/0033596 A1 | | 3/2002 | Katz | 283/49 |
| 2002/0034283 A1 | | 3/2002 | Katz | 379/93.12 |
| 2002/0039409 A1 | | 4/2002 | Katz | 379/93.12 |
| 2002/0080934 A1 | | 6/2002 | Katz | 379/93.02 |
| 2002/0085692 A1 | | 7/2002 | Katz | 379/93.12 |
| 2002/0085693 A1 | | 7/2002 | Katz | 379/93.13 |
| 2002/0093190 A1 | | 7/2002 | Katz | 283/100 |

* cited by examiner

SYSTEM AND METHOD FOR PROCESSING AND COLLECTING DATA FROM A CALL DIRECTED TO A CALL CENTER

TECHNICAL FIELD

The present invention relates to a method and system for processing calls for a call center, and more particularly to a method and system for collecting caller information.

BACKGROUND OF THE INVENTION

In a competitive business environment, in addition to providing quality products, businesses must provide good customer service. For many businesses, customer service requests are received via telephone. For these businesses, a special unit of the business, typically referred to as a call center, is often dedicated to servicing these calls. A call center is often a facility that houses numerous customer service representatives or agents who answer and respond to customer service calls.

At a call center, various types of service or requests are handled, some of which require extensive processing by a customer service representative. Despite the unique needs of some callers, certain types of routine information are asked of every caller, such as telephone number, personal identification number, or service desired. To streamline the processing of calls at a call center, routine questions frequently are asked by an automated system, which is generally termed an interactive voice response (IVR) system. Interacting with an IVR system often requires that a caller dial from a touchtone phone. In many instances, the initial prompt from the IVR system is "Welcome to 'Our Company', if you are dialing from a touchtone phone, please press #1." The next question from an IVR system usually requests the caller to enter some form of identification information. In many cases, the caller's telephone number serves as the identifier for the caller. Some call centers check the incoming call's automatic number identification (ANI) field obtained by conventional caller ID equipment to determine who is calling. However, using ANI may not be very effective for many call centers because during normal business hours, many customers call from work and, consequently, the customer would not be properly identified by the ANI. Thus, many call centers prompt the caller to "Please key in your telephone number." In addition to keying in the telephone number, a caller may be asked to enter the type of service desired so that the call may be routed to the appropriate customer service representative and/or the appropriate information may be retrieved from a database.

Although some call centers implement their own IVR system, coding, integrating, maintaining, supporting, and building the infrastructure for these systems can be burdensome for the call center. Consequently, many businesses delegate the collection of routine caller identification information to a third party or outsourcer. When a third party is used to collect the identification information, the third party receives the initial telephone call, collects the information from the caller and transfers the call and collected data to the call center. Because the call must be transferred to the call center, the call is subject to a "take back and transfer" charge from the interexchange carrier whose network the call originated through. Because some call centers receive millions of calls each year, the call center expense due to the transfer charges can be substantial.

Thus, there is a need for an IVR system that minimizes the customization required by business owners to implement an IVR system and there is a need for a system in which "take back and transfer" charges of interexchange carriers can be avoided when the IVR task are outsourced to a third party.

SUMMARY OF THE INVENTION

Generally described, a system consistent with the present invention processes and collects, at a telephone network central office, information for a call directed to a call center prior to the call being received at the call center.

In one embodiment consistent with the present invention, a call is received for processing at a telephone network central office that is local to the call origination location. At the central office a determination is made as to whether the destination number of the call is identified in a selected database. In response to the call destination number being identified in the selected database, the central office solicits the caller to provide requested information. An indication of the requested information received from the caller is included in a data packet associated with the telephone call before the call is transferred from the central office. The call, including the indication of the requested information, is routed to the call center.

At the central office, it may be determined whether the call originated from a business telephone number or a residential telephone number to facilitate processing of the call. In response to the call originating from a business telephone number, a request may be included for the caller to enter a telephone number for which the caller desires account service from the call center. The requested information may include the type of account service the caller desires from the call center. In another aspect consistent with the present invention, the call received at the central office may include an automatic number identifier that identifies the telephone number from which the call originated, and the automatic number identifier may be replaced, at the central office, by a telephone number input by the caller. A digit of the telephone number contained in the automatic number identification field may be replaced with a number that indicates a type of service the caller desires from the call center. The caller may be requested to enter a geographic area code and before the call is transferred from the central office, a telephone number entered by the caller may be validated with respect to a geographic area entered by the caller. A field of a header of the data packet may be modified to indicate a validation status for the requested geographic area code and the telephone number entered by the caller. The geographic area may be a zip code area. Additionally, a field of the header of the data packet may be used to indicate whether information within the data packet has been modified with requested information received from the caller. A field of a header may also be used to indicate the type of account service indicated by the caller in response to the requested information.

BRIEF DESCRIPTION OF THE DRAWINGS

FIGS. 6a–9 are flow diagrams of the processes implemented in connection with embodiments consistent with the present invention.

DETAILED DESCRIPTION

Referring to the figures, a detailed description of the preferred embodiments of the present invention is described. A system and method operating according to the principles of the present invention enables businesses or subscribers to have IVR operations conducted without custom IVR processing at the business or subscriber call center. A subscriber, as used herein, is generally an entity that contracts with a third party to provide IVR processing for calls to the entity. The present invention also enables a business call center to outsource certain IVR operations without incurring interexchange carrier transfer charges. More specifically, a system operating according to the present invention may implement IVR processing for a call at a central office of a telephone network that is local to the origination point of the call. By utilizing IVR processing at a local central office before the call is transferred to an interexchange carrier network, "take back and transfer fees" can be avoided. In a system or method consistent with the present invention, if the local central office identifies the destination of a telephone call as a subscriber call center, the central office prompts the caller to provide certain information as requested by the subscriber. An indication of the information received from the caller is included in a data package associated with the telephone call and routed to the subscriber call center prior to the call being routed through an interexchange carrier network.

Figure 1:
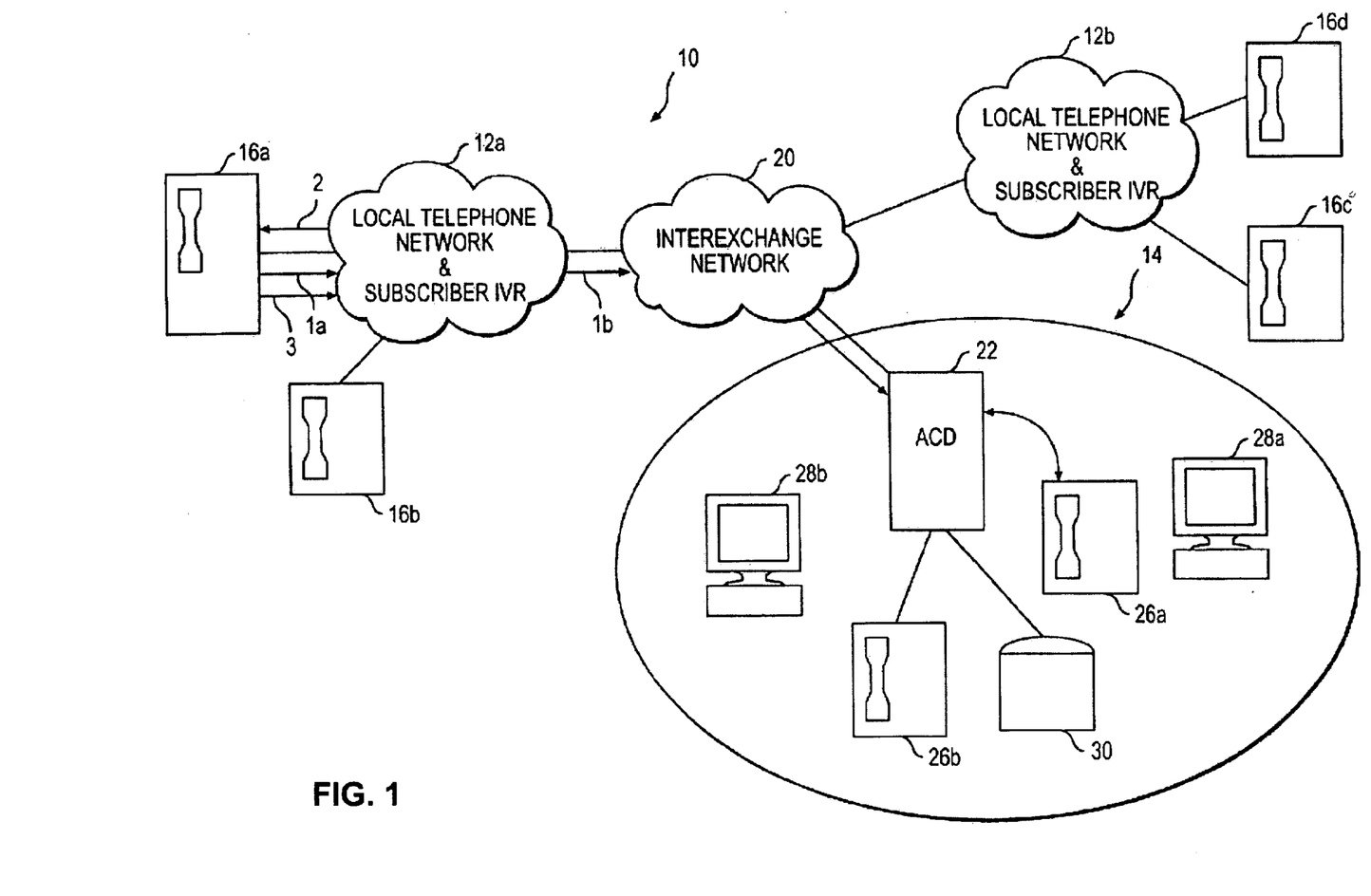
FIG. 1 is a general block diagram of the call processing system consistent with an embodiment of the present invention.

Referring to FIG. 1, a telephone network 10 consistent with the present invention is provided. The telephone network 10 includes local telephone company networks 12a and 12b that each include IVR system capabilities to prompt for and collect information from customers, a subscriber call center 14, customers 16a–d, and an interexchange carrier network 20. The local telephone networks 12a and 12b represent different local calling areas. That is, a call placed from one of these areas to the other will typically result in long distance telephone charges being assessed to one of the parties to the call. The subscriber call center 14 includes an automatic call director (ACD) 22, telephones 26, customer service agent desktop computer systems 28 and a customer information database 30. The automatic call director 22 directs calls received at the call center 14 to agents' telephones 26, or to other appropriate destinations within the subscriber call center 14, potentially based on information contained in the call and/or in the customer database 30. The general processing of a call in the network 10 will be described.

When a call 1a is placed by a caller from telephone 16a, the call 1a originates on a local telephone company network 12a. A central office within the local telephone company network 12a receives the call and evaluates the destination number identifier (DNIS) contained in a data packet associated with the call 1a. The DNIS is the number dialed by the caller. By comparing the DNIS to a list of numbers of subscribers who desire local pre-call center IVR processing, the local central office can determine whether the call 1a should be suspended for local IVR processing. If the call 1a is to be processed at the local central office, the central office sends a prompt 2 back to the caller at telephone 16a to request information that has been specified by a subscriber. In many instances, the subscriber requests that a caller provide a caller ID, such as a telephone number, Social Security Number, product number, or customer account number. In addition to entering customer identification information, the caller is often prompted to enter information that identifies the reason the caller placed the call 1a to the subscriber. This information often includes whether the caller is seeking billing, repair, order, or general information from the subscriber. When the caller responds with the requested information, the caller's response 3 is delivered back to the central office of the local telephone company network 12a for processing. The central office includes the response or an indication of the response 3 in a data packet associated with the call 1a that was suspended by the local telephone company network 12a. The information of the responses, among other IVR processing information, may be generally termed IVR processed data. The call is then transferred as indicated by the arrow 1b to the interexchange network 20 for routing to the subscriber call center 14.

When the call 1b reaches the subscriber call center 14, the automatic call director 22 determines how the call 1b should be processed at the subscriber call center 14. The ACD 22 determines whether the data packet associated with the incoming call has been modified to include pre-call center IVR processed data. If the call includes pre-call center IVR processed data in the data packets, the ACD 22 may access the customer information database 30 to obtain caller records and to route the call directly to a customer service agent at a telephone 26 while simultaneously routing caller records to the agent's workstation. If the ACD 22 determines that the caller did not enter ID information in response to a prompt by the local central office, the call may be routed directly to an agent without caller record information so that the agent can request the needed information. If the call center has a back-up or secondary IVR system, the call center IVR system may prompt the caller to enter the requested information. It should be appreciated by those skilled in the art that the local telephone network 12b processes calls to subscribers/businesses as discussed in connection with the local telephone network 12a.

Advantageously, by utilizing the local central office IVR system capabilities operating according to the principles of the present invention, the subscriber call center 14 does not have to utilize a large volume of resources to handle standard processing questions. Additionally, subscriber call centers can avoid "take back and transfer" charges that are typically incurred when a third party receives calls for a subscriber and then transfers a call to the call center. Typically, when a third party is used to IVR process calls, the third party receives a telephone call from the customer/caller, but after collecting the information from the caller, the third party must transfer the call to the subscriber call center 14. When the call is transferred to the subscriber call center 14, an interexchange carrier "take back and transfer" charge is typically incurred. Because many call centers receive millions of calls each year, the subscriber call center 14 can reduce their overhead costs significantly by avoiding take back and transfer charges when utilizing a system or method operating according to the principles of the present invention.

Call Processing at the Local Central Office

Figure 2:
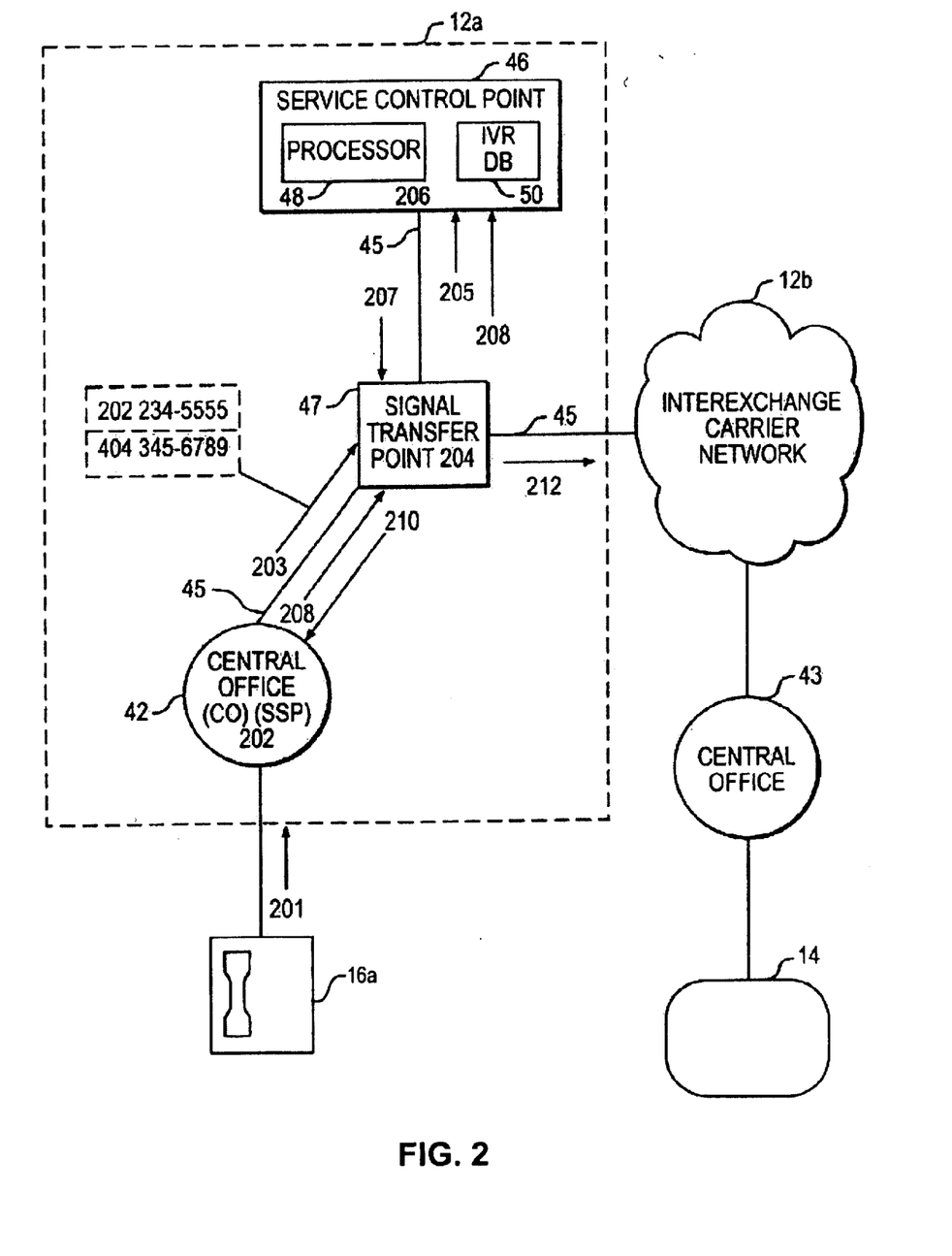
FIG. 2 is a detailed diagram of call processing at a local telephone network central office consistent with an embodiment of the present invention.

Referring to FIG. 2, a switching system of the local telephone network 12a and the call processing steps implemented with the preferred embodiment of the present invention are shown. The description associated with FIG. 2 provides a more detailed discussion of the components of the telephone network 10 and the processes implemented at a local telephone network central office. As those skilled in the art will understand, a telephone 16a of a calling party is connected to the calling party's central office (CO) 42 which includes a service switching point (SSP). A subscriber location 14 is connected to a central office (CO) 43 which includes a service switching point. The service switching points are connected by Signaling System 7 (SS7) data links 45 to a service control point 46. A signal transfer point (STP) 47 may be provided between the service switching point central offices 42 and 43 and service control point (SCP) 46 along the SS7 data links 45. The STP 47 routes call processing queries between the central offices 42 and 43 and the service control point 46. In setting up a call from the telephone 16a to subscriber location 14, the service switching point of the central office 42 communicates with the service switching point associated with the subscriber's location via digital data communication channel 45. When the call is routed, a communication path is set up between the telephone 16a and subscriber location 14. Of course, it will be understood by those skilled in the art that other network devices may be involved in the communication of the call set up.

These data links 45 are bi-directional data links employing a signaling system protocol referred to as SS7, promulgated by the American National Standards Institute (ANSI). The SS7 protocol is a layered protocol wherein each layer provides services for layers above it and relies on the layers below it. The protocol employs data packets that have a signal information field that includes user specific data and a routing label. A service information octet is included in the data packets and the octet identifies a priority of the message, the national network of the destination of the message, and the user name identifying the entity that created the message. Also, certain control and sequence numbers are included within the data packets, the uses and designations of which are known to those skilled in the art familiar with SS7 protocol.

Much of the intelligence and the basis for many of the features of the network reside in the local service control point 46 that is associated with a local central office. The service control point 46 includes a processor 48 and a subscriber IVR database 50. As is known to those skilled in the art, service control points are typically implemented by relatively powerful fault tolerant computers. The IVR database 50 identifies particular service subscribers for IVR processing and certain database information used for handling calls that are to be IVR processed. In order to keep the processing of data and calls as simple and generic as possible at switches, such as a service switching point of the central office 42, a relatively small set of triggers are defined at the SSP at particular points in call processing. A trigger at a service switching point is an event encountered at some point in call processing that causes the service switching point to suspend call processing, such as when an IVR prompt is required, and to generate a data packet to be sent to the service control point 46. The trigger causes the service control point 46 to query its database to determine the customized IVR calling feature to be provided. The results of the data inquiry are sent back to the service switching point through service transfer point 47. The return data packet includes instructions to the service switching point as to how to process the call. In the preferred environment, the service control point 46 is the host for the feature logic and service data which is processed by processor 48.

With continuing reference to FIG. 2, a description of the manner in which a call to a subscriber is processed is provided. At step 201, a calling party dials, from the telephone 16a, the telephone number of a subscriber. At step 202, the central office serving the calling party recognizes the routing number as a subscriber's number, e.g., 202-234-5555, and causes a trigger to suspend call processing. A transactions capabilities application part (TCAP) query is formulated by an SSP of the central office 42 and launched onto the SS7 signaling network 45 at step 203. A TCAP query is a data packet that contains the calling party number, e.g., 404-345-6789 and the dialed telephone number, e.g., 202-234-5555, along with other call routing information. At step 204, when the TCAP query arrives at the signal transfer point 47, the content of the data packet at the protocol level applicable to the signal transfer point 47 is examined. At step 205, the TCAP query is then routed from the signal transfer point 47 to the service control point 46 where the routing feature logic and the subscriber's data reside.

The service control point 46 accesses subscriber IVR databases 50 and determines the appropriate prompts or questions to present for the appropriate subscriber based on the routing information specified in the subscriber's data at step 206. The subscriber IVR databases 50 may contain code and data that specifies how a call shall be processed and the information to be associated with the call. Embodiments consistent with the present invention may vary and the logic and processes associated with each is stored in the SCP 46. For example, in one embodiment consistent with the present invention, a subscriber may specify that only a subscriber's telephone number and the type of service, such as billing, repair, order, or general information be requested from a caller. In another embodiment, a subscriber may request that information be included in a data packet associated with the call that indicates whether the caller is calling from a touchtone phone or not. Depending upon the capabilities of the central office, the central office may automatically determine whether a subscriber is calling from a touchtone telephone. If the central offices does not have the capability of determining whether the caller is calling from a touchtone phone, the caller may be prompted to provide an indication of whether the caller is calling from a touchtone phone.

In yet another embodiment, the subscriber may request that the central office determine whether the caller is dialing from a business or residence. Because many customers of a subscriber call during working hours, the customers are dialing from their business location and not their home phone number. In this case, the number identified by ANI would not be the appropriate number for the subscriber to use in identifying the customer. Therefore, the customer is requested to enter the telephone number, account number, or product number for which service is desired. When a caller enters the service number or identifier for the service desired, the number identified by ANI or the billing party ID in the data packet associated with the call may be replaced with the identifier provided by the caller. In another embodiment of the present invention, the service control point 46 may prompt the caller to enter a geographic area code, such as a zip code, in addition to the entered telephone number. When the caller enters the zip code, the service control point 46 performs a database comparison to a table that contains telephone numbers and their associated zip codes. If the caller enters a telephone number that is associated with the zip code listed in the table, an indication is provided in the data packet query to indicate that the telephone number has been properly validated. The SCP 46 may indicate by a different code that the zip code was not entered or does not match the telephone numbers listed in the data tables.

After one of these embodiments is invoked for the subscriber DNIS, message 207 is generated. Message 207 represents the various prompts or questions that may be asked of a caller. Message 208 indicates the responses that are provided by a caller. After analyzing the caller's response, the service control point 46 sends a TCAP response message 210 back to the service switching point of the central office 42 that originated the query containing instructions for routing the call and containing the information collected from the caller. At step 212, the service switching point of the central office 42 routes the call along with the collected information to interexchange carrier 20 for routing to the subscriber call center 14.

Data Packet Format

Figures 3A, 3B:
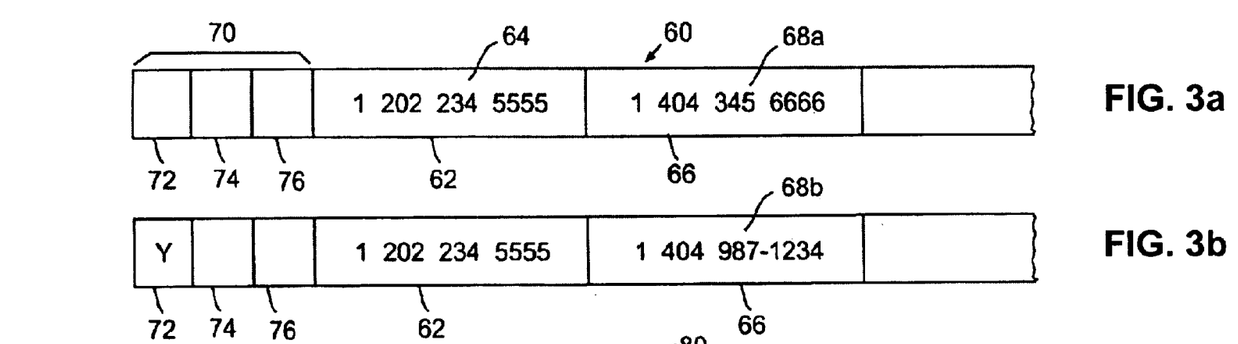
FIGS. 3a–3e are diagrams of data packet formats used in connection with embodiments consistent with the present invention.

Having discussed the manner of processing and routing a call through a telephone network, the content of an SS7 data packet as modified according to the present invention for use in call and data processing is discussed in more detail. Data fields of an SS7 data packet are well known in the art. Many of these data fields are not relevant to the principals of the present invention and consequently will not be discussed. Referring to FIG. 3a, an example of the relevant fields of a data packet used in connection with systems consistent with the present invention is illustrated. The data packet 60 has a destination field 62 for the dialed or destination number 64, a calling party field 66 for the calling party number 68a, and a header 70 with fields 72, 74, and 76. The destination field 62 and the calling party field 64 are automatically populated with the subscriber's telephone number and the calling party number, respectively, by the telephone network when the call is placed. The header contains data for use in basic data packet processing and handling. Although most fields of the header are used for general SS7 data packet processing, the fields 72, 74, and 76 are unused fields of the header. The system and method consistent with the present invention modifies or replaces information in the header fields 72, 74 and/or 76 and/or modifies or replaces information contained in the calling party number field 66 to indicate certain information learned about the calling party at the central office. The field 72 may be used to indicate whether or not the local central office has modified the data packet with information relevant to call center processing, field 74 may be used as an input validation field, and field 76 may be used as a field to indicate the type of service requested by a user.

Referring to FIG. 3b, the data packet 60 associated with one embodiment consistent with the present invention replaces the ANI field number 66 with a caller input number. For example, when a calling party dials a call center from the calling party's workplace, the local central office prompts the calling party to enter the calling party's residential telephone number. The business telephone number 66 initially identified in the calling party field 66 of FIG. 3a is replaced with a caller input telephone number 68b illustrated in FIG. 3b. Because the data packet has been modified with information relevant to processing at the call center, an indicator is placed in the field 72, such as "Y," to indicate that the data packet has been modified. The call center evaluates field 72 to determine whether the other relevant fields of the data packet should be evaluated for processing at the call center. If the data packet is not modified at the local central office, an indication, such as "N," may be used to indicate that the data packet has not been modified with any IVR processed data. It shall be appreciated that binary numbers or other forms of indicators may be used as indicators of information in a data packet. For example, the binary number "1" could be used instead of "Y" and binary number "0" could be used instead of "N." It should be appreciated that a billing party field number may be used in conjunction with an embodiment consistent with the discussion of FIG. 3b instead of an ANI party field number.

Figure 3C:
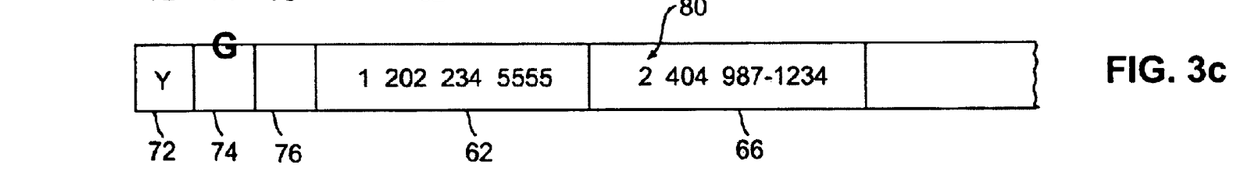

In addition to replacing a business telephone number with a telephone number input by the caller, the ANI number field may be further used to include other information relevant to the caller. For example, the first number in the ANI field, such as the number "1" (FIG. 3b), may be replaced with a processing number 80, such as the number "2" (FIG. 3c), to indicate that the caller is dialing from a touchtone phone. Consequently, the ANI field 66 may be modified to specify an identification number of a caller as well as include additional information that indicates other information for call processing within the same field.

Figure 3D:
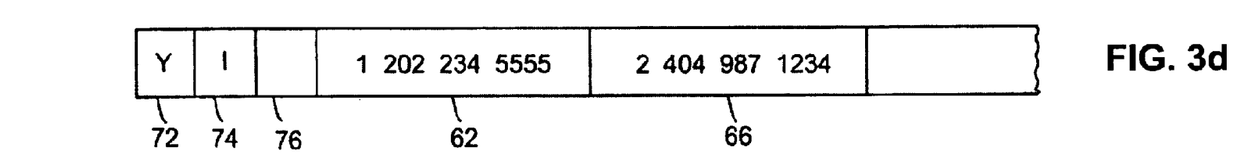

Referring to FIG. 3d, a data packet 60 as modified in accordance with another embodiment consistent with the invention is shown. In this configuration, the local central office validates information input by a caller. The local central office requests the caller to input a telephone number as well as the zip code of the area from which the telephone number input by the caller is located. When the local central office collects the zip code and telephone number from the caller, the local central office compares this information with a table of telephone numbers associated with zip codes. This zip code table may be stored in the SCP 46. If the input zip code and telephone number are associated in the table, an indication of validation is provided in the data field 74. In the example shown in FIG. 3d, the value "1" is input into the data field 74 to indicate that the zip code and telephone number match. Other indications of validation can be used in the field 74, such as the number "2," to indicate that the zip code and telephone number did not match in the table, and the number "3" can be used to indicate that no zip code was entered.

Figure 3E:
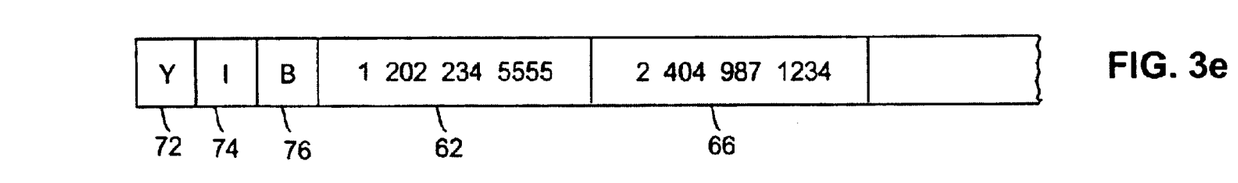

In another configuration consistent with the present invention a data packet is modified to indicate a service selected by a caller. For example, the local central office requests that the user provide the type of service that the user desires. The type of service is indicated by a number and can be used as a routing or database access number within the subscriber call center. For example, the user may be prompted to state the word "billing" or to press the number "1" to indicate that the user desires billing information. The user may be requested to state the word "repair" or enter the number "2" to indicate that the user desires repair services. The user may be requested to state the word "order" or enter the number "3" to indicate that the user wishes to place an order. Thus, when the user selects the type of service desired (FIG. 3e), the field 76 is populated with a corresponding indicator, such as the number "3" to indicate that the user desires "order" services. Thus, this configuration uses a combination of the configurations shown in FIGS. 3a–e. In summary, the field 72 indicates that the data packet has been modified, the field 74 indicates that the telephone number and zip code were validated, the field 76 indicates that the user has selected "ordering" services, and the first digit of the ANI field 66 indicates that the user is dialing from a touchtone telephone.

Figure 4A:
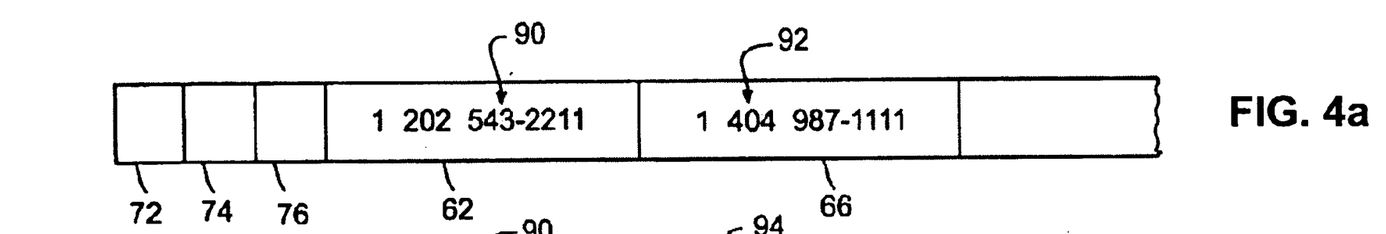
FIGS. 4a and 4b are diagrams of data packet formats used in connection with additional embodiments consistent with the present invention.
Figure 4B:
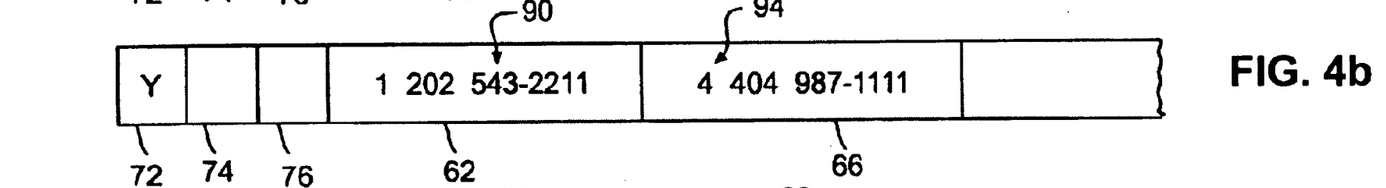

Referring to FIG. 4a, a data packet as modified in accordance with another embodiment consistent with the present invention is illustrated. The data packet illustrated in FIG. 4a shows a calling party number 92 in the data field 66 and a destination number 90 in the data field 62. In this configuration, the first digit of the calling party number field may indicate a combination of types of information indicated by a user. For example, in FIG. 4b, the first digit of the calling party number is a "4." The number "4" may be one of nine numbers which indicate various combinations of selections entered by a user. For example, the number "4"

may indicate that the user is dialing from a touchtone phone and has selected billing as the service desired. Consistent with this configuration, the number "3" may indicate that the user is dialing from a touchtone phone but has indicated that the user desires repair service. The number "5" may indicate that the user is dialing from a touchtone phone and has selected ordering as the desired service. When the first digit of the calling party number is utilized to indicate a type of service desired by the user, the field 76 may be used to indicate various other types of information or may not be used at all for processing at the call center.

Figure 5A:
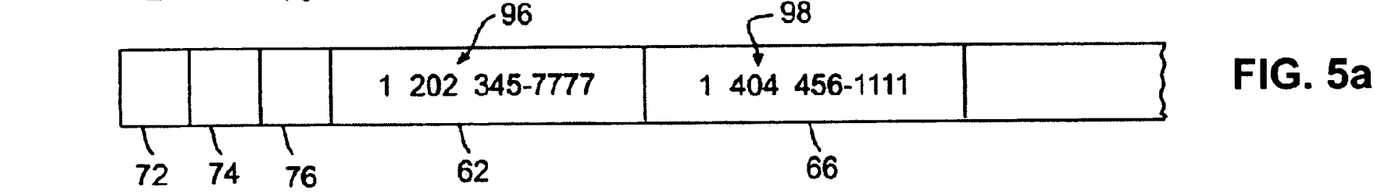
FIGS. 5a and 5b are diagrams of a data packet format used in connection with additional embodiments consistent with the present invention.
Figure 5B:
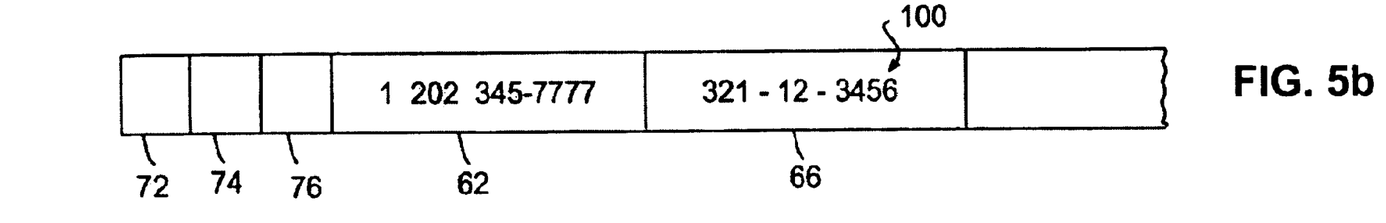

Referring to FIG. 5a, the data structures of the data packet consistent with another embodiment of the present invention is illustrated. In FIG. 5a, the local central office receives the data packet with the calling party number 98 indicated as "1-404-456-1111" and the dialed number 96 as "1-202-345-7777." When the local central office determines that the call should be IVR processed, the local central office may prompt the caller to enter an account number other than a telephone number, such as a Social Security Number. When the calling party enters the Social Security Number, the calling party number originally received as illustrated in FIG. 5a is replaced with the Social Security Number 100 entered by the caller. The Social Security Number may now be used as the identifier for locating the caller's records at a subscriber call center.

Processes of the Preferred Embodiments

Figure 6A:
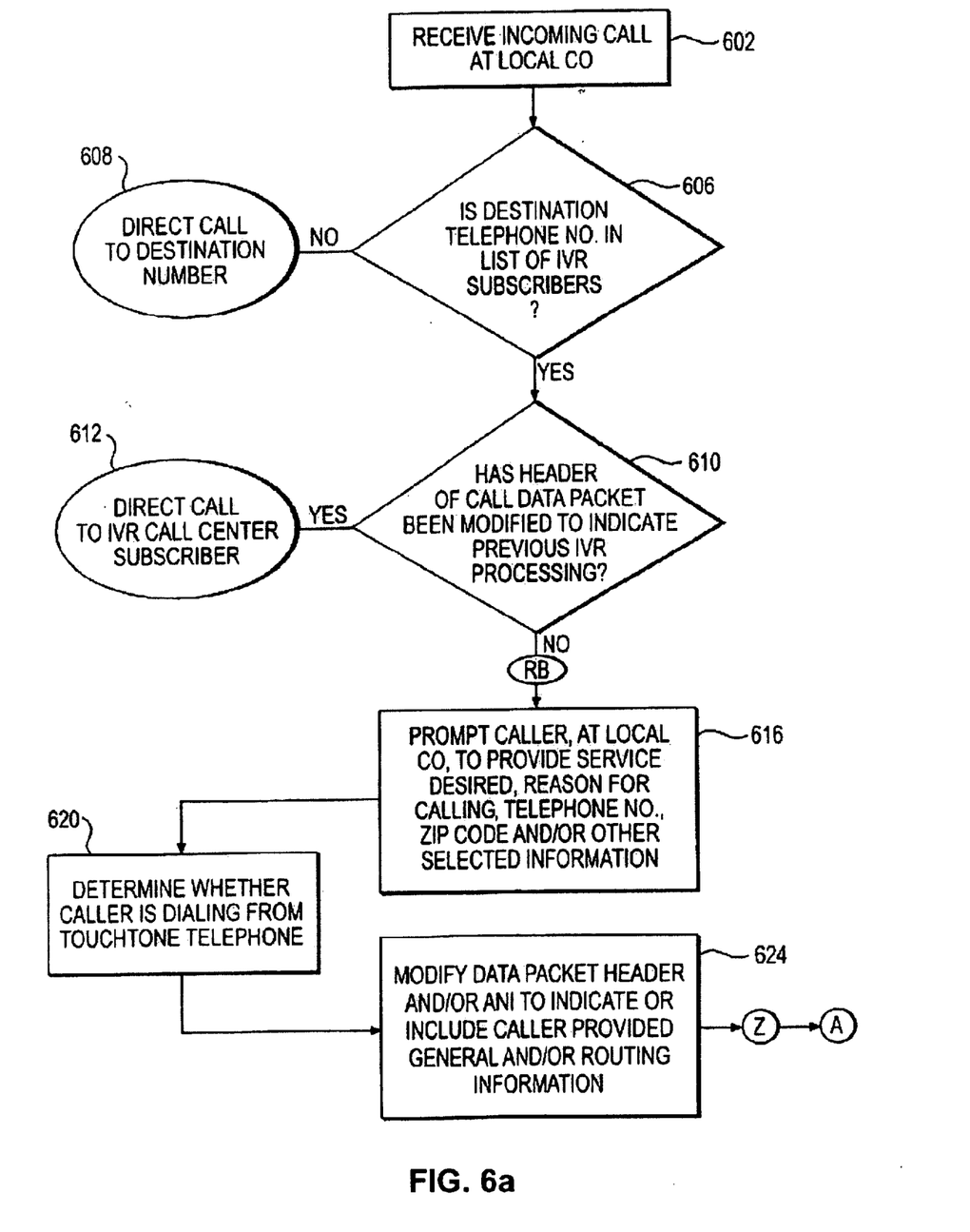
Figure 6B:
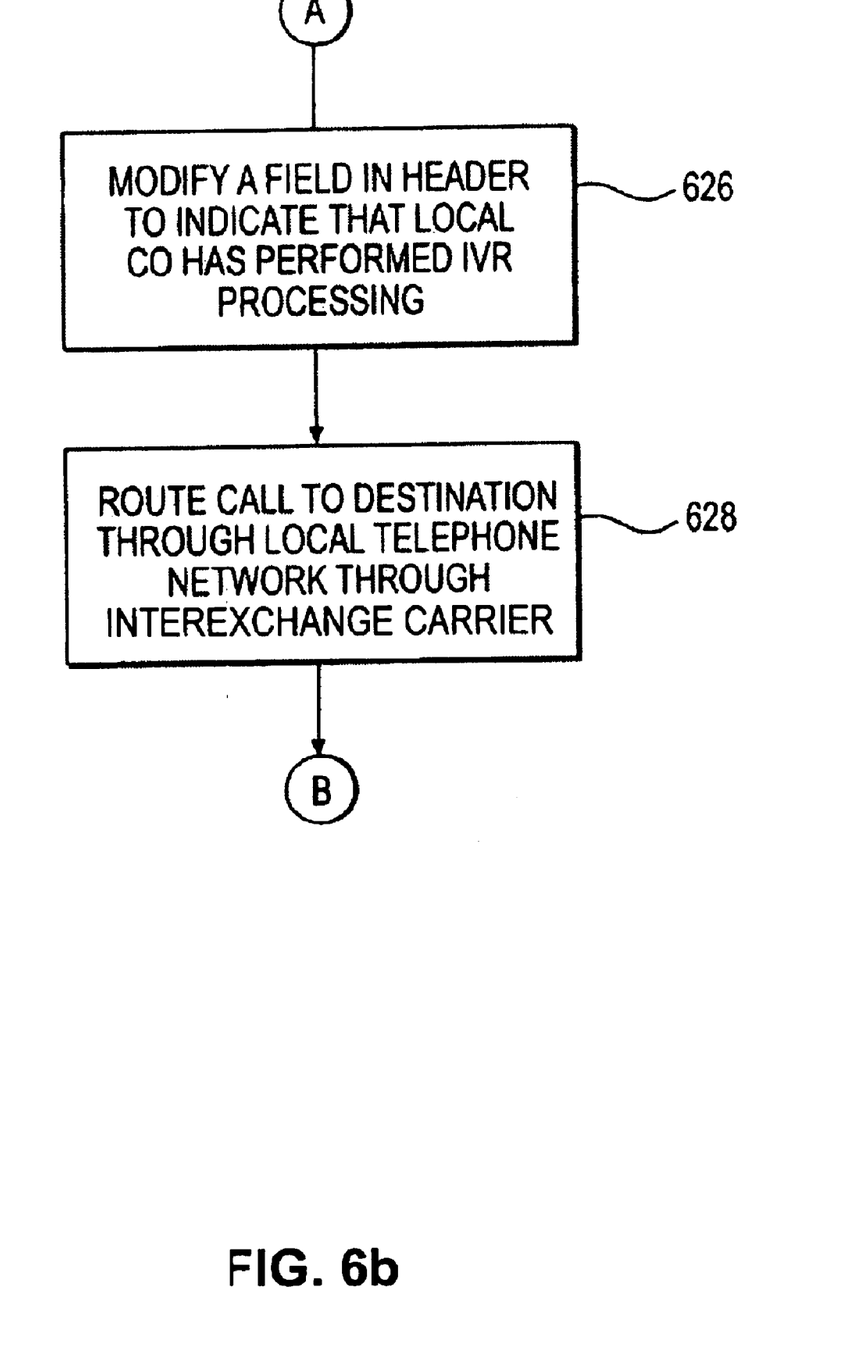

Referring to FIGS. 6a–9, the processes to implement operations consistent with the present invention will be discussed. Referring specifically to FIG. 6a, a local central office 42 receives a call from a calling party 16 (step 602). The central office determines, based upon the dialed telephone number, whether the destination of the telephone call is to a business that desires interactive voice response processing at the central office (step 606). A list of subscribers who desire IVR processing is maintained at the service control point 46 associated with the local central office 42. If the destination telephone number is not in the list of subscribers, the call is routed to the destination number (step 608). If, however, the call is directed to a subscriber, the process proceeds to step 610. A local central office then determines whether the header of the data packet has been modified to indicate that IVR processing has already occurred at a local central office that first received the call (step 610). If IVR processing has already occurred, the call is routed to the subscriber call center (step 612). If, however, the call has not been previously processed by a local central office IVR system, the local central office prompts the caller to provide the service desired, reason for calling, telephone number, zip code, and/or other information requested by the subscriber (step 616). Typically, such prompts will include an option for a user to enter a number associated with a stated option, such as press 1 for billing, press 2 for ordering, or press 3 for repair. Additionally, a caller may be prompted to provide caller identification information, such as telephone number or Social Security Number. The central office may determine automatically whether the call was placed from a touchtone telephone by evaluating the call data packet or may prompt the caller to provide this information (step 620). The local central office modifies the data packet and/or ANI field to indicate or include the caller-provided information and/or routing information as discussed in connection with FIGS. 1–5b (step 624). The process then proceeds to step 626 (FIG. 6b) where a field in the data packet is modified to indicate that the local central office has performed IVR processing. The call is routed to the dialed destination number through a local telephone network or through an interexchange carrier(step 628). Although steps 602–628 discuss the general steps associated with the present invention, other implementations provide custom processing as desired by a business discussed in connection with FIGS. 7–9.

Figure 7:
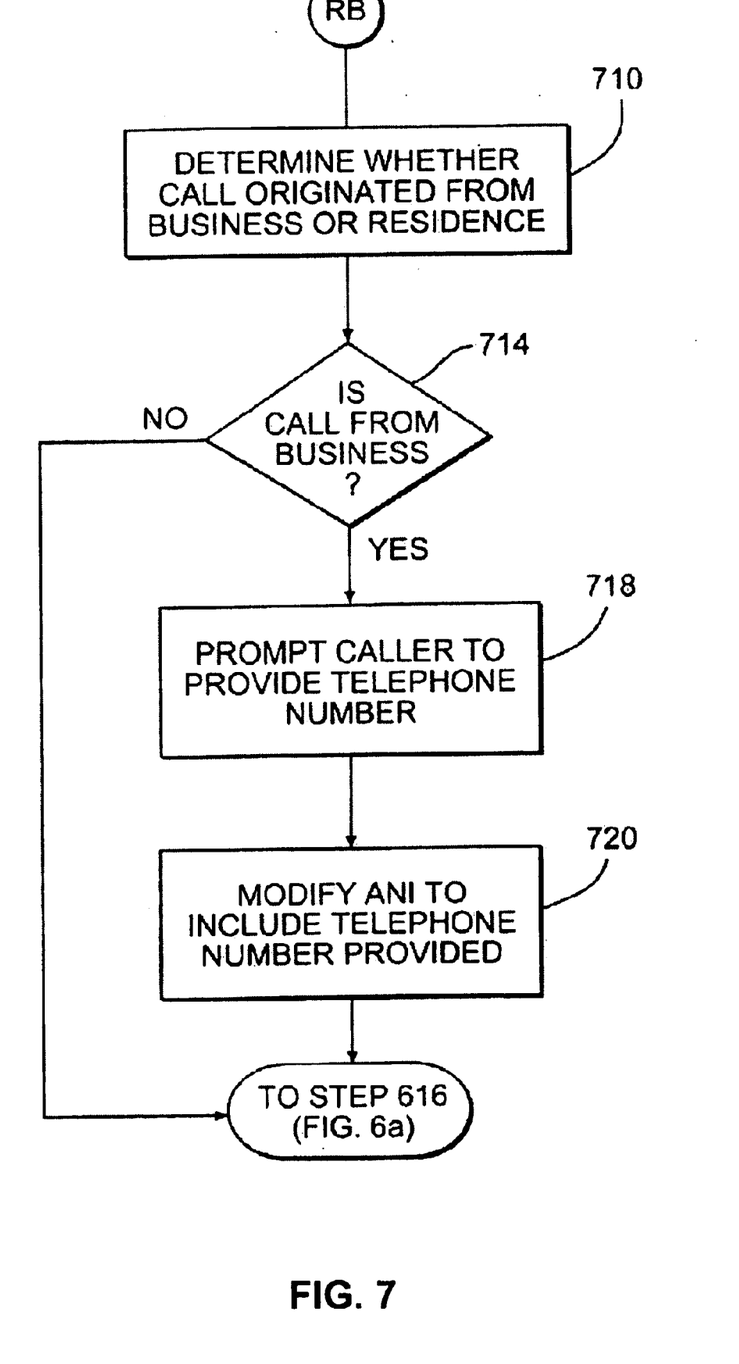
Figure 8:
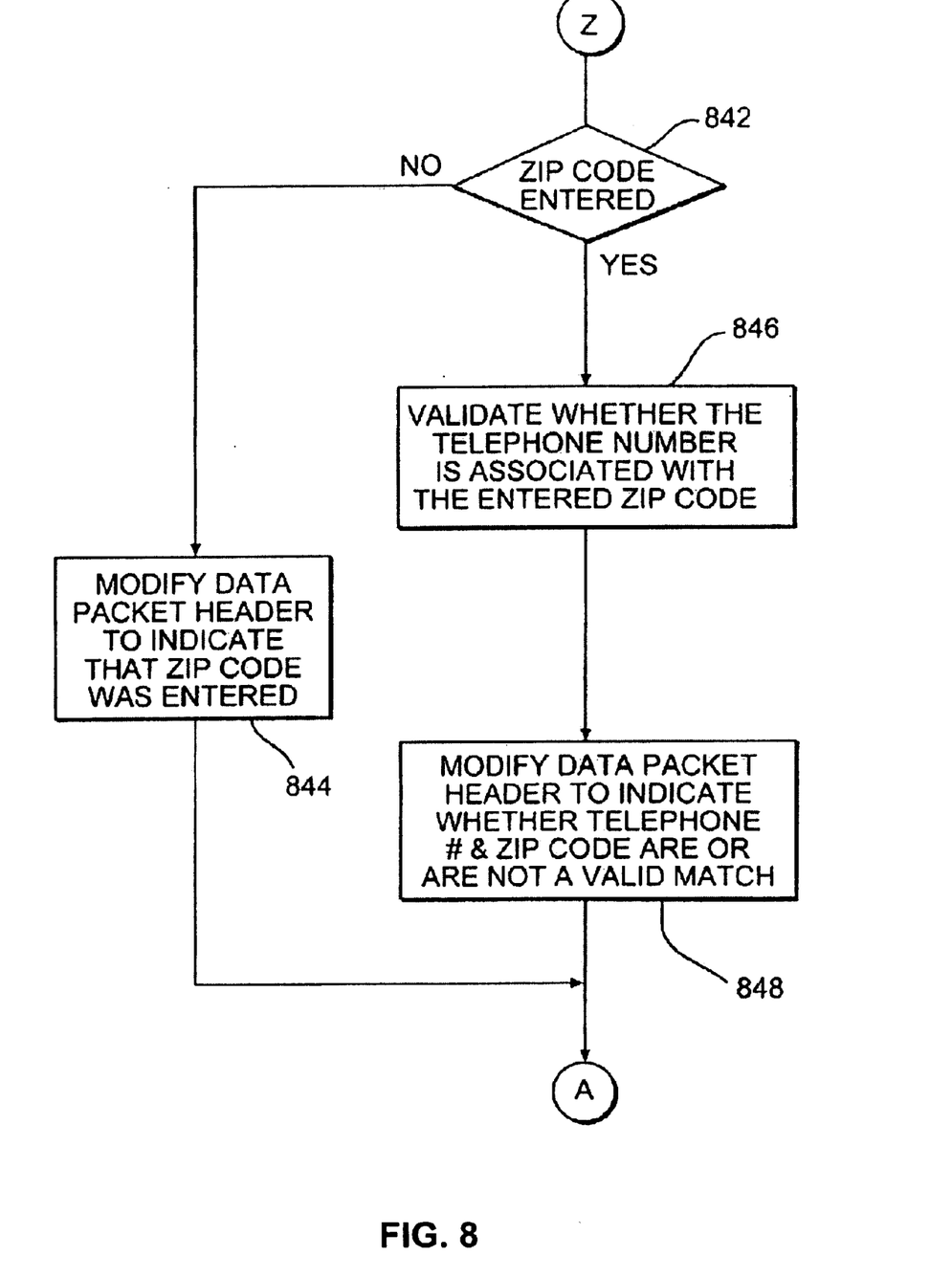

Referring to FIG. 7, an embodiment of the present invention which determines whether a user is calling from a business or personal residence is discussed. The processes of FIG. 7 may be implemented at "RB" of FIG. 6a. As noted above, many customers of businesses call regarding their personal account information from work. Consequently, automatic number identification (ANI) will often not suffice as an appropriate identifier for the customer at a call center. The embodiment of the present invention discussed in FIG. 7 first determines whether a call originated from a business or residence (step 710). If the call does not originate from a business telephone number, the ANI number can be used as an identifier of the residential number of a caller (step 714). The process then proceeds to step 616 as discussed above. If, however, the call is from a business telephone number (step 714), the process proceeds to step 718 where the caller is prompted to provide the caller's telephone number. The caller may be prompted to enter the telephone number through a touchtone key pad or vocally to be interpreted by speech recognition software. The process then replaces the ANI number originally submitted in the data packet to include the telephone number provided by the caller as discussed in connection with FIG. 3b (step 720). The process then proceeds to step 616 as discussed above.

In another implementation consistent with the present invention (FIG. 8), the process operates to validate information submitted by a customer. This process may be implemented at "Z" of FIG. 6a. For example, the local central office may prompt the caller to enter both a telephone number and a zip code. The entered telephone number is compared to a table of telephone numbers that are associated with the zip code. If the entered telephone number and zip code do not match the telephone number and zip code associations stored at the local central office, the process will indicate that the caller's telephone number needs to be verified. For subscribers who desire telephone number and zip code verification, the process determines whether the caller entered a zip code (step 842). If the caller did not enter a zip code, the header of the data packet is modified to indicate that the caller did not enter a zip code (step 844). If, however, a zip code was entered (step 842), the local central office validates whether the telephone number is associated with the entered zip code in the telephone number/zip code table (step 846). The header of the data packet is modified to indicate whether the telephone number and zip code are or are not a valid match in the zip code table (step 848). A specific number or character may be included in the header to indicate whether or not the telephone number and zip codes were validated. For example, the number "1" can be used in a designated field to indicate that there was a valid match, whereas the number "2" can be used in the specified field to indicate that there was not a valid match. After the appropriate indication of validation has been made, the process will proceed to step 626 as discussed above.

Figure 9:
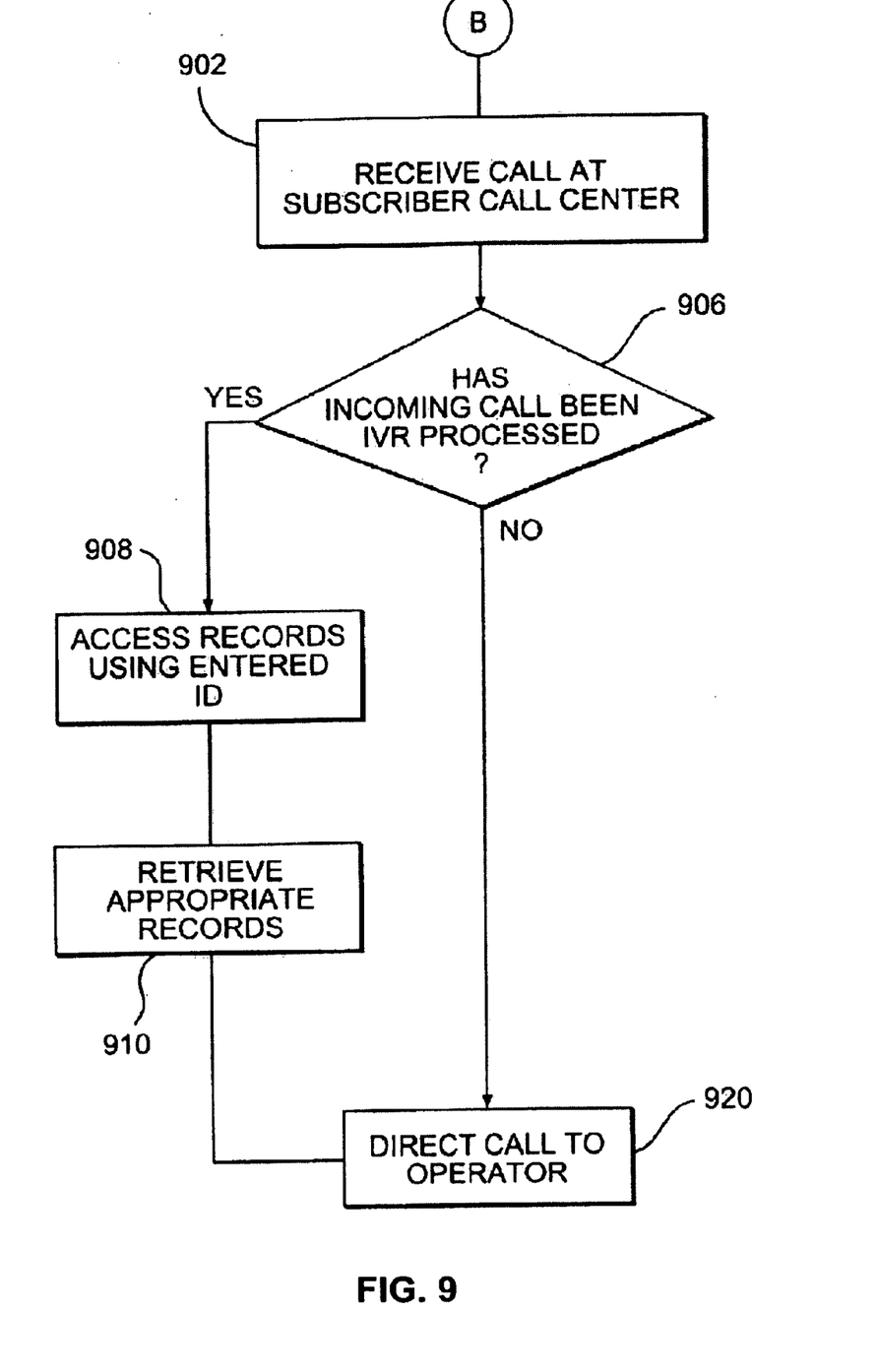

After the call has been processed at the local central office, the call will be routed to a subscriber call center 14, typically through an interexchange carrier network 20. Referring to FIG. 9, the manner in which a call is processed at the call center is illustrated. First, a call is received at the call center (step 902). The process determines whether the incoming call has been IVR processed by examining field 72 of the data packet 60 (step 906). If the incoming call has been IVR processed, the user identification information is used to access the business records associated with the caller (step 908). The business records are retrieved based on identification information and/or service information contained in the modified data packet (step 910). If the call has not been processed by an IVR system (step 906), the call may be passed directly to an operator so that the operator can request the necessary information (step 920).

Although various embodiments of the invention have been described herein, those skilled in the art appreciate that many modifications and adaptations can be made to the described embodiments without departing from the scope of the following claims.

What is claimed is:

1. A method for processing a call from a device located at an origination point to a call center, the method performed by a processor coupled to a distribution site in a local calling area associated with the device, wherein said distribution site is designated to handle all calls from the device located at the origination point, comprising:

receiving at the distribution site a call from the device directed to the call center, including an automatic number identifier having been provided by a telecommunication facility;

requesting a caller operating the device to input information reflecting a purpose for the call;

storing the information reflecting a purpose for the call;

determining a type of telephone number associated with the received call;

sending, based on the determined type of telephone number, a request to the caller operating the device to provide a telephone number for which an account service is requested from the call center;

replacing the automatic number identifier with a telephone number provided by the caller; and routing the call from the distribution site to the call center with an indicator corresponding to the purpose for the call.

2. The method of claim 1 wherein determining a type of telephone number associated with the received call comprises:

determining, at the distribution site, whether the call originated from a business telephone number or a residential telephone number.

3. The method of claim 2, wherein sending a request includes:

requesting the caller to provide the telephone number for which the caller requests account service from the call center in response to the determination that the call originates from a business telephone number.

4. The method of claim 3 further comprising requesting a type of account service the caller desires from the call center.

5. The method of claim 1 further comprising requesting a type of account service the caller desires from the call center.

6. The method of claim 1 further comprising requesting a caller identification number.

7. The method of claim 6 wherein the caller identification includes a telephone number.

8. A method for processing a call from a device located at an origination point to a call center, the method performed by a processor coupled to a distribution site in a local calling area associated with the device, wherein said distribution site is designated to handle all calls from the device located at the origination point, comprising:

receiving at the distribution site a call from the device directed to the call center;

requesting a caller operating the device to input information reflecting a purpose for the call;

storing the information reflecting a purpose for the call;

determining a type of telephone number associated with the received call;

sending, based on the determined type of telephone number, a request to a caller operating the device to provide a telephone number for which an account service is requested from the call center;

routing the call from the distribution site to the call center with an indicator corresponding to the purpose for the call; and requesting the caller to enter a geographic area identification number and validating whether the telephone number entered by the caller is associated with a geographic area entered by the caller.

9. A system for processing a call directed to a call center, comprising;

a first telephone network central office located in a first geographic area and having a local calling area, and a second telephone network central office located in a second geographic area and having a local calling area different from local calling area of the first geographic area;

said first and second telephone network central offices being operative to receive calls for processing that are local to an origination location of the calls, wherein the calls include an automatic number identifier that identifies the telephone number from which each call originated;

said first telephone network central office and said second telephone network central office being operative to determine whether a destination number of a received call is identified in a database of call centers that desire to have information elicited, at the central office, from callers;

in response to the call destination number being identified in the database, said first telephone network central office and said second telephone network central office being operative to determine a type of telephone number associated with the received call and, based on the determined type of telephone number, to prompt the caller to provide a telephone number for which an account service is requested from the database of call centers;

said first telephone network central office and said second telephone network central office being operative to replace the automatic number identifier with a telephone number provided by the caller in a data packet associated with the telephone call; and said first telephone network central office and said second telephone network central office being operative to route a call and the data packet to the call center.

10. The system of claim 9 wherein said first telephone network central office and said second telephone network central office are operative to determine whether the call originated from a business telephone number or a residential telephone number to facilitate processing of the call.

11. The system of claim 10 wherein said first telephone network central office and said second telephone network central office are operative to prompt the caller to enter a telephone number for which the caller desires account service from the call center, in response to the call originating from a business telephone number.

12. A method for processing a call directed to a call center, comprising:
- receiving a call at a telephone network central office that is within a local calling area of an origination location of the call;
- determining, at said central office, a type of telephone number associated with the received call;
- requesting based on the determined type of telephone number, from the central office, the caller to provide requested information;
- including, at the central office, an indication of the requested information received from the caller in a data packet associated with the telephone call; and
- routing the call, including the indication of the requested information, from the central office to the call center.

13. The method of claim 12 further comprising the step of determining, at the central office, whether the call originated from a business telephone number or a residential telephone number to facilitate processing of the call.

14. The method of claim 13 comprising the step of: including a request in the requested information for the caller to enter a telephone number for which the caller desires account service from the call center, in response to the call originating from a business telephone number.

15. The method of claim 14 wherein the requested information includes a type of account service the caller desires from the call center.

16. The method of claim 14 wherein the call received at the central office includes an automatic number identifier that identifies the telephone number from which the call originated, and wherein the automatic number identifier is replaced, at the central office, by a telephone number received from input by the caller.

17. The method of claim 12 wherein the requested information includes a type of account service the caller desires from the call center.

18. The method of claim 12 wherein the requested information includes a caller identification number.

19. The method of claim 16 wherein the caller identification includes a telephone number.

20. The method of claim 19 further comprising requesting the caller to enter a geographic area identification number and validating whether a telephone number entered by the caller is associated with a geographic area entered by the caller.

21. The method of claim 20 further comprising modifying a field of a header of the data packet to indicate a validation status for the requested geographic area and the telephone number entered by the caller.

22. The method of claim 21 wherein the indicated geographic region includes a zip code area.

23. The method of claim 22 wherein the requested information includes a telephone number, wherein the call received at the central office includes an automatic number identifier that identifies the telephone number from which the call originated, and wherein the automatic number identifier is replaced, at the central office, by a telephone number received from input by the caller.

24. The method of claim 12 further comprising modifying a field of a header of the data packet to indicate whether information within the data packet has been modified with requested information received from the caller.

25. The method of claim 24 comprising modifying a header field that is not used for routing the call to its intended destination.

26. The method of claim 18 further comprising modifying a field of a header to indicate the type of account service indicated by the caller in response to the requested information.

27. The method of claim 12 further comprising replacing a digit of the telephone number contained in the automatic number identification field of the data packet with a number that indicates a type of service the caller desires from the call center.

28. The method of claim 27, wherein the digit is the first digit of the telephone number.

* * * * *